(12) United States Patent
Bhattacharyya et al.

(10) Patent No.: US 11,256,318 B2
(45) Date of Patent: Feb. 22, 2022

(54) TECHNIQUES FOR MEMORY ACCESS IN A REDUCED POWER STATE

(71) Applicant: Intel Corporation, Santa Clara, CA (US)

(72) Inventors: Binata Bhattacharyya, Portland, OR (US); Paul S. Diefenbaugh, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 186 days.

(21) Appl. No.: 16/536,408

(22) Filed: Aug. 9, 2019

(65) Prior Publication Data

US 2019/0361516 A1    Nov. 28, 2019

(51) Int. Cl.
| | |
|---|---|
| G06F 1/00 | (2006.01) |
| G06F 1/3287 | (2019.01) |
| G06F 1/3206 | (2019.01) |
| G06F 3/06 | (2006.01) |
| G06F 9/30 | (2018.01) |
| G06F 12/06 | (2006.01) |

(52) U.S. Cl.
CPC .......... *G06F 1/3287* (2013.01); *G06F 1/3206* (2013.01); *G06F 3/064* (2013.01); *G06F 3/0625* (2013.01); *G06F 9/30098* (2013.01); *G06F 12/0607* (2013.01); *G06F 3/0679* (2013.01)

(58) Field of Classification Search
CPC .... G06F 1/3287; G06F 1/3206; G06F 3/0625; G06F 9/30098; G06F 12/0607; G06F 3/064; G06F 3/0679; G06F 1/3275; G06F 12/0284; G06F 2212/1028; G06F 3/0634; Y02D 10/00; Y02D 30/50

See application file for complete search history.

(56) References Cited

U.S. PATENT DOCUMENTS

| | | | | |
|---|---|---|---|---|
| 5,991,889 A | * | 11/1999 | Hikichi | G11C 7/00 713/501 |
| 8,539,272 B1 | * | 9/2013 | Yeung | G06F 1/3206 713/324 |
| 2002/0083288 A1 | * | 6/2002 | Kim | G06F 3/0613 711/173 |
| 2008/0104437 A1 | * | 5/2008 | Lee | G06F 1/3203 713/323 |

(Continued)

*Primary Examiner* — Xuxing Chen
(74) *Attorney, Agent, or Firm* — Kacvinsky Daisak Bluni PLLC (57) ABSTRACT

Various embodiments are generally directed to techniques for memory access by a computer in a reduced power state, such as during video playback or connected standby. Some embodiments are particularly directed to disabling one or more memory channels during a reduced power state by mapping memory usages during the reduced power state to one of a plurality of memory channels. In one embodiment, for example, one or more low-power mode blocks in a set of functional blocks of a computer may be identified. In some such embodiments, the computer may include a processor, a memory, and first and second memory channels to communicatively couple the processor with the second memory. In many embodiments, usage of the one or more low-power mode blocks in the set of functional blocks may be mapped to a first address range associated with the first memory channel.

25 Claims, 7 Drawing Sheets

(56) References Cited

U.S. PATENT DOCUMENTS

| | | | |
|---|---|---|---|
| 2014/0365715 A1* | 12/2014 | Lee | G06F 3/0653 |
| | | | 711/103 |
| 2015/0046732 A1* | 2/2015 | Chun | G11C 14/0009 |
| | | | 713/323 |
| 2020/0089498 A1* | 3/2020 | Annamalai | G06F 1/3206 |
| 2020/0183622 A1* | 6/2020 | Hubbard | G06F 3/061 |
| 2020/0257627 A1* | 8/2020 | Chamarty | H04L 67/2847 |

* cited by examiner

Identify one or more low-power mode blocks in a set of functional blocks of a computer, the computer comprising a processor with one or more cores, a memory, a first memory channel, and a second memory channel, the first memory channel and the second memory channel to communicatively couple the processor with the memory
402

Map usage of the one or more low-power mode blocks in the set of functional blocks to a first address range associated with the first memory channel
404

*FIG. 5*

Storage Medium 500

Computer Executable
Instructions for 400

TECHNIQUES FOR MEMORY ACCESS IN A REDUCED POWER STATE

BACKGROUND

Generally, computing devices may operate at different power states depending on varying performance requirements and/or objectives. For example, when a computing device is operating on electricity provided by a power grid it may operate at a power state with higher performance and higher power consumption. On the other hand, when the computing device is operating on electricity provided by a battery it may operate at a power state with lower performance and lower power consumption. Sometimes the power state of a computing device may depend on the tasks being requested of it. For instance, when the computing device is tasked with video playback, it may enter a power state for playing video while maximizing battery life. Oftentimes, different power states may disable/enable nonessential/essential components of the computing device. For example, a computing device may place one or more cores of a processor in standby in a reduced power state.

DETAILED DESCRIPTION

Various embodiments are generally directed to techniques for memory access by a computing device in a reduced power state, such as during video playback or connected standby. Some embodiments are particularly directed to disabling one or more memory channels during a reduced power state by mapping memory usages during the reduced power state to one of a plurality of memory channels. In one embodiment, for example, an apparatus for a computing device (or computer) may comprise a processor and one or more memories comprising a first memory and a second memory, the first memory comprising instructions that when executed by the processor cause the processor to perform one or more of the following techniques to access the second memory in a reduced power state. In some embodiments, the processor may identify one or more low-power mode blocks in a set of functional blocks of a computer. In some such embodiments, the computer may include a processor, a memory, and first and second memory channels to communicatively couple the processor with the second memory. In many embodiments, the processor may map usage of the one or more low-power mode blocks in the set of functional blocks to a first address range associated with the first memory channel. These and other embodiments are described and claimed.

Some challenges facing reduced power states in computers include consuming power to access data for execution via multiple memory channels during reduced power states. For example, memory accesses may be interleaved across multiple memory channels, requiring use of multiple channels to operate in the reduced power states and leading to reduced hours of battery life (HOBL). Adding further complexity, migrating memory from one channel to another is a time and power intensive operation requiring one or more memory remappings. Accordingly, migrating memory to a single channel prior or upon entering a reduced power state may be inefficient or impractical. Some embodiments may offload functional blocks as part of chipset (or platform controller hub (PCH)), which may run on local memory like (static random-access memory (RAM)). However, this requires excessive dedicated memory, or frequently waking main memory, adding to design cost and increasing power in low power modes, such as connected standby (CS). These and other factors may result in reduced power states with excessive power waste, limited applicability, and poor adaptability. Such limitations can drastically reduce the usability and performance of reduced power states, contributing to inefficient systems, devices, and techniques with reduced HOBL.

Various embodiments described herein include the ability to proactively map memory usages by low-power mode functional blocks, or components, to a memory channel designated for use in a reduced power state. Many embodiments include a memory manager with an affinity to map identified functional blocks to a select memory channel. For example, computers including CS compliant devices (e.g., mobile, laptop, 2-in-1 etc.) may utilize one or more of low power audio, display, wireless connectivity to provide an always connected experience. In such examples, the memory manager may map all the memory usages associated with providing the always connected experience to a single memory channel, enabling one or more other memory channels to be disabled during reduced power states. In some embodiments, power gating and/or setting memory modules in self-refresh mode may be utilized as part of or in conjunction with disabling memory channels. Many embodiments provide a low power light weigh memory access pipeline for low power always on (AON) usages.

In various embodiments, techniques described herein may avoid memory migration from one memory channel to another, such as by mapping AON components and/or usages to a common memory channel. Several embodiments may provide low-power video playback with extended HOBL. In one or more embodiments, one or more portions of a memory channel may be utilized for low power modes and/or reduced power states while other portions of the memory channel are interleaved with one or more other memory channels to maximize memory bandwidth in addition to maximizing HOBL. In many embodiments, as performance demand increases, such as when a computer exits a low power mode (e.g., CS or S0ix to active S0 mode) additional memory channels and/or portions of the reduced power memory channel may be utilized.

In these and other ways, components described here may increase efficiency, decrease performance costs, decrease computational cost, extend battery life, and/or reduce resource requirements to implement low power modes, in an accurate, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, such as to map usage of one or more low-power mode blocks in a set of function blocks to a first address range associated with a first memory channel, and thereby provide additional and useful functionality to the one or more computing devices, resulting in more capable, better functioning, and improved computers. Further, one or more of the aspects, techniques, and/or components described herein may be utilized to improve the technical field of low power modes, reduce power states, memory pipelining, and/or memory mapping in computers.

In several embodiments, components described herein may provide specific and particular manners of creating a memory access pipeline in a computer to optimize performance and/or HOBL. These specific and particular manners of creating the memory access pipeline may include, for instance, a memory manager may map low power usages to lower address ranges, which are in turn are mapped to a first memory channel. Further, a register may be used to configure the memory manager. In many embodiments, the memory manager may be configured to map components, or usages thereby, of a computer to identified memory channels. In many such embodiments, this may enable other memory channels to be disabled, resulting in improved battery life. In many embodiments, one or more of the components described herein may be implemented as a set of rules that improve computer-related technology by allowing a function not previously performable by a computer that enables an improved technological result to be achieved. For example, the function allowed may include automatically assigning one or more low-power mode blocks of a computer to a first memory channel to improve efficiency of the low-power mode, such as by enabling additional memory channels to be disabled. One or more of these techniques may provide a scalable power reduction technique with low power usages and/or configurability of power with performance as computation intensity increases/decreases.

With general reference to notations and nomenclature used herein, one or more portions of the detailed description, which follows, may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

Figure 1:
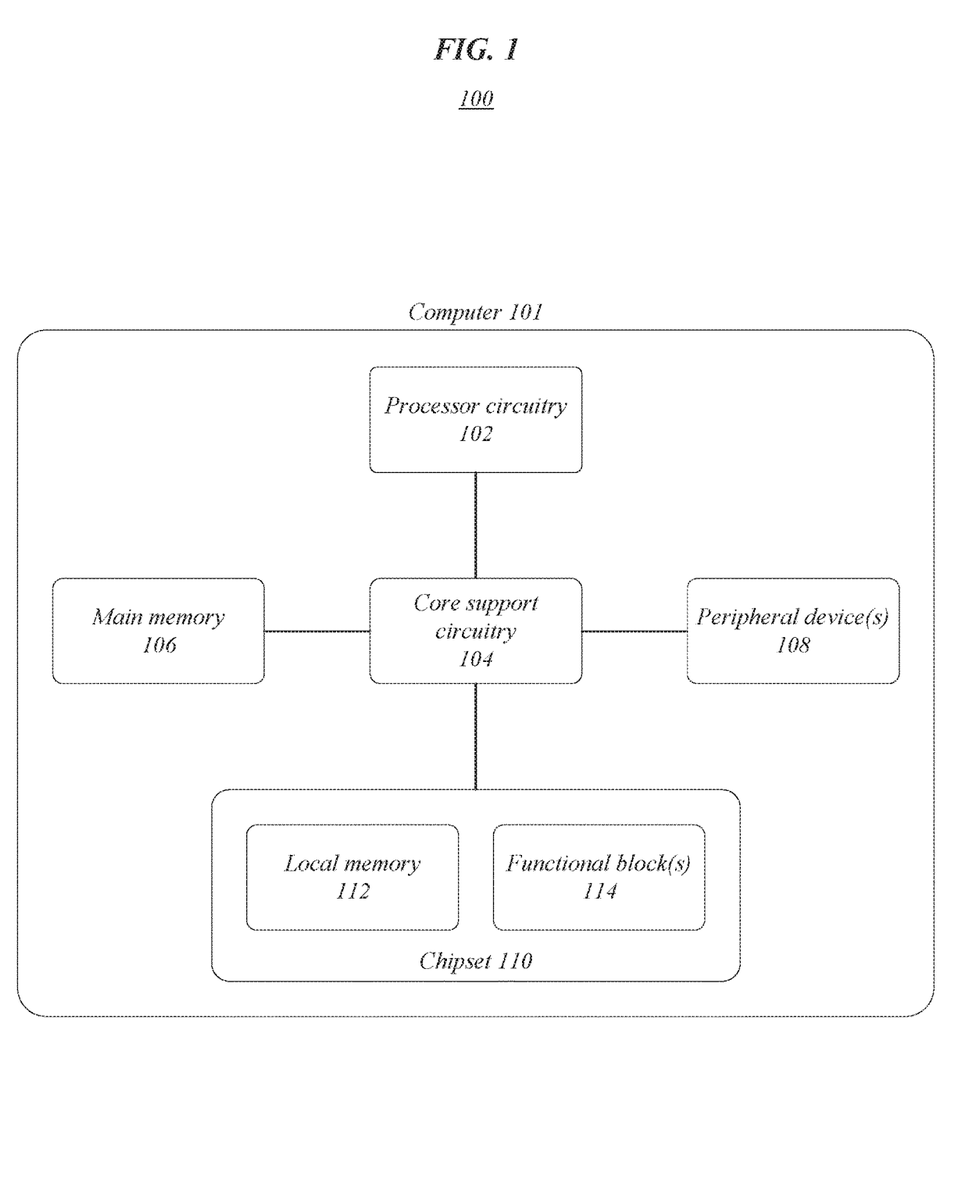
FIG. 1 illustrates a first exemplary operating environment to enable pipelined memory accesses in selected power states according to one or more embodiments described herein.

FIG. 1 illustrates an exemplary operating environment 100 to enable pipelined memory accesses in selected power states according to one or more embodiments described herein. In some embodiments, operating environment 100 may comprise a computer 101. In operating environment 100, computer 101 may include processor circuitry 102, core support circuitry 104, main memory 106, one or more peripheral devices 108, and chipset 110 with local memory 112 and one or more functional blocks 114. In one or more embodiments described herein, a memory pipeline may be established between main memory 106 and one or more additional components, such as one or more cores of processor circuitry 102, one or more peripheral devices 108, and/or one or more functional blocks 114. In one or more such embodiments, the memory pipeline may be utilized to extend HOBL of the computer 101, such as in low-power modes (i.e., reduced power states). In many embodiments, the memory pipeline may enable one or more memory channels to be disabled and/or associated memory modules power gated or set in self-refresh mode. Embodiments are not limited in this context.

In one or more embodiments, computer 101 may operate in a plurality of power states or modes. In various reduced-power modes described herein, one or more components of computer 101 may be restricted, limited, disabled, and/or powered down to conserve power. For instance, a memory channel and/or memory module, such as those associated with main memory 106, may be power gated or placed in self-refresh mode to conserve power during a reduced-power mode. In some embodiments, one or more of the components of computer 101 may interoperate to enable access to main memory 106 via a select subset of a set of memory channels coupling main memory 106 to other components of computer 101, such as core support circuitry 104 and chipset 110. For example, components of computer 101 may enable one or more functional blocks 114 and/or one or more portions of processor circuitry 102 to access main memory 106 via a common memory channel.

In various embodiments, each of the one or more functional blocks 114 may include, or refer to, one or more functionality and/or components of computer 101. In various such embodiments, one or more of the functional blocks 114 may be utilized in low power states. Accordingly, in many embodiments described herein, subsets of the one or more of functional blocks 114 may be selectively assigned to individual memory channels. In many such embodiments, these and other features can enable more efficient reduced power states. For example, control over memory channel mapping may enable additional or alternative memory channels and/or corresponding memory modules to be placed into a reduced-power state, such as by power gating or self-refresh mode.

In some embodiments, processor circuitry 102 may include one or more processors with one or more cores. In various embodiments, processor circuitry 102 may execute instructions to perform one or more functions or techniques described herein. For example, processor circuitry 102 may execute instructions stored main memory 106 and/or local memory 112. In one or more embodiments, main memory 106 may include system memory or random-access memory (RAM) In many embodiments, local memory 112 may include central processing unit (CPU) memory, cache memory, static RAM (SRAM), and/or registers. In many embodiments, peripheral devices 108 may include one or more of input/output (I/O) devices, removable media, secondary memory, tertiary memory. In one or more embodiments, data may be loaded into main memory 106 and/or local memory 112 from one or more peripheral devices 108. For example, the one or more peripheral devices 108 may include a hard disk storing instructions that are loaded into main memory 106 for execution.

In some embodiments, one or more interconnects may connect components of computer 101. For example, peripheral devices 108 may connect via one or more of peripheral component interconnect (PCI), PCI express (PCIe), universal serial bus (USB), connectors, display, versions, types, and the like. In various embodiments, one or more of a point-to-point interconnect, a memory bus, and a ring interconnect may be utilized to communicatively couple components of computer 101. In several embodiments, main memory 106 may be communicatively coupled to core support circuitry 104 and/or chipset 110 via one or more memory channels.

More generally, core support circuitry 104 may include functions of computer 101 that are not in a core of processor circuitry 102, but which are closely connected to a core, such as to achieve high performance. For instance, processor circuitry 102 may include one or more of an arithmetic logic unit, a floating-point unit, L1 cache, L2 cache and the core support circuitry 104 may include one or more of interconnect controller, L3 cache, snoop agent pipeline, and an on-die memory controller. In some embodiments, one or more portions of the core support circuitry 104 may be comprised in chipset 110 and/or vice-a-versa. The core support circuitry 104 and/or chipset 110 may include a set of electrical components in an integrated circuit that managers the data flow between processor circuitry 102, main memory 104, and peripheral devices 108.

Figure 2:
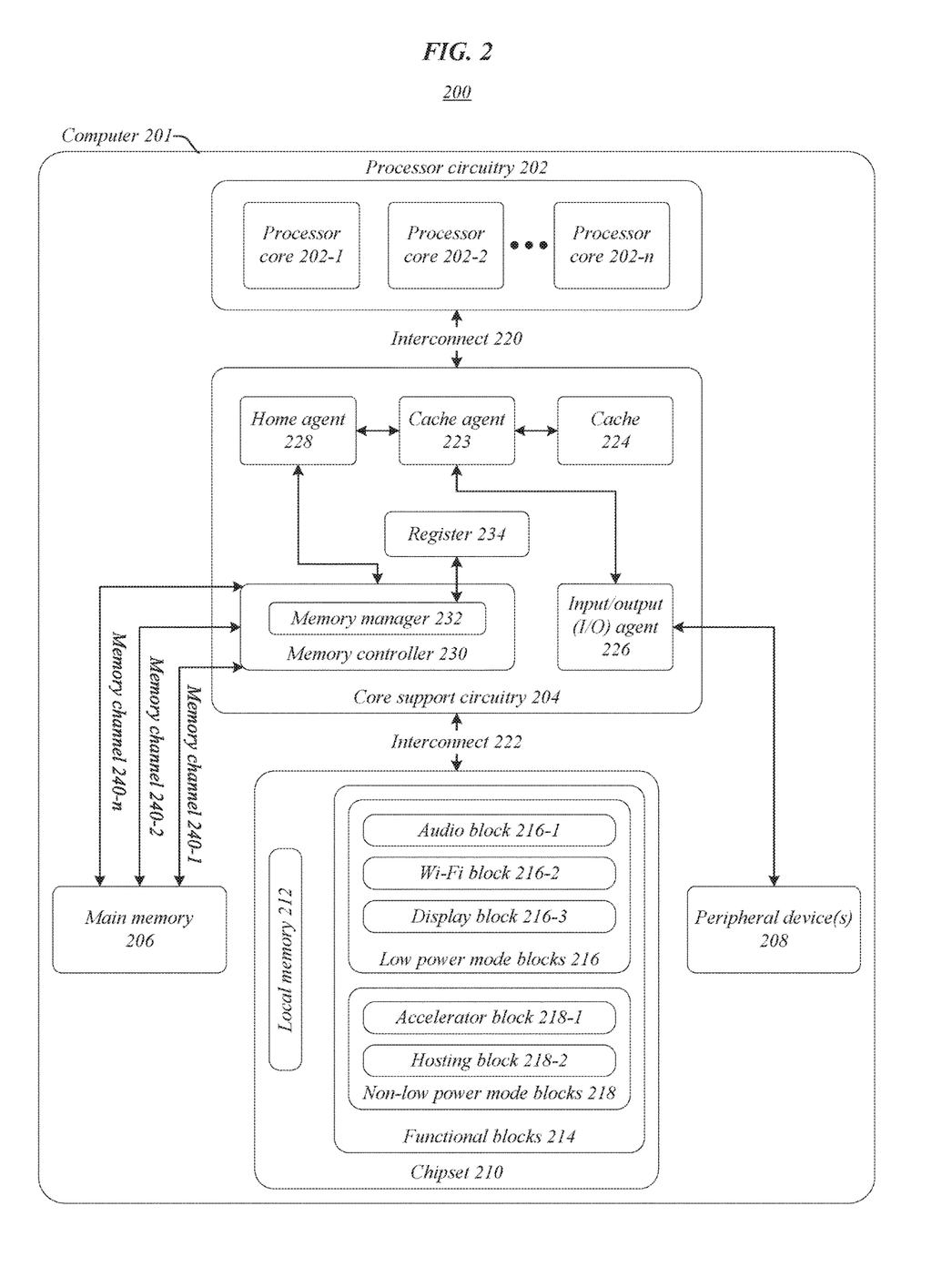
FIG. 2 illustrates a second exemplary operating environment to enable pipelined memory accesses in selected power states according to one or more embodiments described herein.

FIG. 2 illustrates an exemplary operating environment 200 to enable pipelined memory accesses in selected power states according to one or more embodiments described herein. In many embodiments, one or more components of operating environment 200 may be the same or similar to components of operating environment 100. In operating environment 200, computer 201 may include processor circuitry 202 communicatively coupled to core support circuitry 204 via an interconnect 220; main memory 206 communicatively coupled to core support circuitry 204 via one or more memory channels 240-1, 240-2, 240-n (or memory channels 240); one or more peripheral devices 208; and chipset 210 communicatively coupled to core support circuitry 204 via interconnect 222. In several embodiments described herein, one or more of memory channels 240 memory usages associated with a selected power state may be assigned to a common one of the memory channels 240. Embodiments are not limited in this context.

As shown in the illustrated embodiment, processor circuitry 202 may include one or more processor cores 202-1, 202-2, 202-n (or processor cores 202), core support circuitry 204 may include cache agent 223, cache 224, input/output (I/O) agent 226, home agent 228, memory controller 230 with memory manager 232, and register 234. Additionally, chipset 210 may include local memory 212 and one or more functional blocks 214. Further, the one or more functional blocks 214 may include a subset of low power mode blocks 216 and a subset of non-low power mode blocks 218. It will be appreciated that the illustrated components are representative, and additional/alternative components may be used in performing one or more techniques described herein without departing from the scope of this disclosure.

In some embodiments, for example, memory manager 232 may have an affinity for mapping low power mode blocks 216 to memory channel 240-1. In such embodiments, during reduced power states, one or more of memory channels 240-2, 240-n and/or corresponding portions of main memory 206 may be placed in low power modes. For example, mapping usages of main memory 206 by audio block 216-1, Wi-Fi block 216-2, and display block 216-3 of low power mode blocks 216 to memory channel 240-1 may enable extended HOBL during video playback.

In several embodiments, control over memory channel usage may enable computer 201 to save power. For instance, 300-400 mW may be saved by mapping low power mode blocks 216 to one memory channel (with benchmarks like HOBL_productivity, 4 k 30 fps low power video playback). In various embodiments, mapping and/or mapping settings may be utilized in creation of a memory pipeline across one of memory channels 240. In many embodiments, one or more portions of memory channels 240 not utilized for selected power states may be interleaved. In many such embodiments, interleaving unutilized portions of the memory channels 240 may optimize memory bandwidth. In some embodiments, each memory channel 240 may have peak 50 GB/s bandwidth. In various embodiments, main memory 206 may use 8 GB or 16 GB per channel More generally, in one or more embodiments, for example, components of computer 201 may communicate to physical memory (e.g., main memory 206) using two x64 memory channels. In some embodiments, one or more of the memory channels 240 may include at least one sub channel (e.g., x16, x32, x64). In some such embodiments, banks and ranks based on memory modules (e.g., hardware, firmware) and associated configuration may be utilized. In various embodiments one or more components of computer 201, such as memory manager 232 and register 234, may be utilized to implement low power light weight memory access pipelines, such as for AON usages.

In some embodiments, interconnect 220 and interconnect 222 may be the same or similar. In various embodiments interconnects 220, 222 may be part of a single interconnect. In several embodiments, interconnects 220, 222 may include one or more data busses. In many embodiments, interconnects 220, 222 may include one or more of point-to-point interconnects and ring interconnection.

In some embodiments, a portion of processor cores 202 may comprise high computing (HC) cores and low computing (LC) cores. In some such embodiments, HC and LC cores can be independently controlled/implemented based on the workload requirement. For example, in various embodiments, at system boot, LC cores may be ON and HC cores may be OFF. As the workload increases and performance demand increases (e.g., past various thresholds), additional HC cores may be turned ON. As the workload reduces, the system goes idle, and/or performance demand falls below a threshold, HC cores may be turned OFF.

In many embodiments, the connectivity of processor cores 202 or non-coherent IOs may pass through core support circuitry 204. For instance, non-coherent IOs may pass via I/O agent 226. In such instances, I/O agent 226 may enable data to pass between cache 224 and peripheral device 208. As previously mentioned, the illustrated embodiment of core support circuitry 204 includes cache agent 223, cache 224, I/O agent 226, home agent 228, memory controller 230, memory manager 232, and register 234. In some embodiments, one or more of each of the illustrated components may be utilized. The cache agent 223 may receive/send requests associated with one or more of processor cores 202, such as via, or based on, cache 224. In various embodiments, the contents of register 234 may be utilized to configure, manager, and/or control memory manager 232.

In several embodiments, register 234 may include a knob that can be set or rest by soft strap or basic I/O system (BIOS). In various embodiments, contents of the register 234 (or multiple registers) may indicate a low power mode (lp_mode) and/or power gating (pg_mode) settings. In various such embodiments, soft strap or BIOS may set the low power mode by setting the contents of the register 234. In some embodiments, when register 234 includes a positive value a low power light weight memory access pipeline may be enabled. In this mode, memory channel 240-1 may be active while the one or more other memory channels 240-2, 240-n are power gated or at self-refresh mode depending on platform configurations (such as contents of register 234). In various embodiments, the memory access pipeline is optimized to lower power, such as by consolidating memory channel usage.

For example, when a low power small form factor laptop uses one or more of lower resolution display (e.g., 2 k resolution) or low-end graphics (e.g., 32 execution unit graphics engine) and number of cores set to 4 or 6, at boot BIOS can choose to set lp_mode=1 (enabling pipeline) and pg_ch1_mode=1 to power gate memory_channel_1 and keep only memory_channel_0 active. In such example, even at S0, while running low power usages, total power spent may be appreciably lower than when using both memory channel (e.g., 300-500 mW savings), resulting in improved HOBL.

In an example of a laptop with high-end graphics and higher resolution display (e.g., 4 k resolution or higher), when it enters into idle mode (SOix), BIOS may set lp_mode=1 and pg_ch1_mode=1. Accordingly, when running only low power usages like AON audio, low power video, and/or low power connectivity, memory_channel_0 will remain active and memory_channel_1 will be in self-refresh (but not power gated). Even at S0, while running low power usages, total power spent is may be appreciably lower than when using both memory channel (e.g., 280-480 mW savings), resulting in improved HOBL.

In several cases, when performance demand increases with high-end graphics or high-resolution video playback, etc, the memory manager 232 may keep audio, Wi-Fi, and/or other low power usages within lower address ranges (e.g., lower 4 GB) mapped to memory_channel_0 and the rest of the usages may be memory mapped with interleaving across memory_channel_0 above 4 GB and memory_channel_1. In many embodiments, this may enable better memory bandwidth and/or capacity as demand increases with high performance usages. Additionally, or alternatively, switching from low power to high performance mode may avoid need for memory migration from memory_channel_1 to memory_channel_0 (or vice-a-versa) because low power usages are always kept in the lower address region in memory_channel_0.

In many embodiments, BIOS may set or reset lp_mode=0, such as to turn on memory_channel_1 pipeline and enables memory_channel_1. In many such embodiments, when computer 201 enters idle mode, BIOS may set lp_mode=1, such as to cause at SOix exit with low power usages, fir low power light weight memory pipeline will be active and dependent on performance demand increase, when 1p mode resets back to 0, second memory channel may be switched on. In one embodiment, a processor with four core subsystems with DDR4 2400MT/s, single rank configuration, by populating a single memory_channel_282 mW of power savings for HOBL productivity benchmark and 290 mW of power savings for 1080p 30 fps low power video playback.

Referring back to the illustrated embodiment, cache agent 223 may be connected to one or more of the processor cores 202 via interconnect 220. In many such embodiments, interconnect 220 may include a point-to-point interconnect, a shared bus, or similar. Requests targeted to memory (e.g., main memory 206) pass through the home agent 228. In some embodiments, home agent 228 may maintain coherency and/or consistency of memory accesses. Requests targeted to IOs like PCIe USB audio, video, etcetera may be passed to one of a set of I/O agents.

In various embodiments, as performance demand increase, such as when computer 101 exits low power mode (CS or SOix) to active S0 mode, available portions of the memory channels may be populated and utilized by computer 201. In various such embodiments, non-low power blocks 218 (e.g., accelerator block 218-1 and/or hosting block 218-2) may be populated on the additional memory channels. In many embodiments, low power mode blocks 216 may always use memory_channel 240-1. In many such embodiments, using memory channel 240-1 as such can avoid memory migration between channels. In several embodiments, computer 201 may include one or more of a mobile phone, a handheld device, high performance devices, high power devices, high-end computers and desktops.

In some embodiments, (e.g., modern/CS compliance), as soon as computer 101 goes idle, it may enter SOix state. In one or more embodiments, as soon as low power usages like AON audio, low power video playback with lower display resolution, low power connectivity (e.g., with Wi-Fi) needs to access main memory 206, computer 101 exits SOix state and enters into active state (S0) which may wake one or more of processor cores 202. For example, the power of processor circuitry 212 may increase to X in S0 power state until computer 101 becomes idle, upon which the power state may be moved to SOix to lower system power.

In one or more embodiments, memory manager 232 may include a modified application programming interface (API) memory manager, such as part of an operating system (OS). In many embodiments, memory manager 232 may manage system address mapping such that usages by low power mode blocks 216 have affinity to lower address regions, which may be mapped to a known memory channel. In one or more embodiments, the selected functional blocks (e.g., low power mode blocks 216) may be mapped to the low 4 GB address range. In one or more such embodiments, the low 4 GB address range may map to memory channel 240-1.

Figure 3:
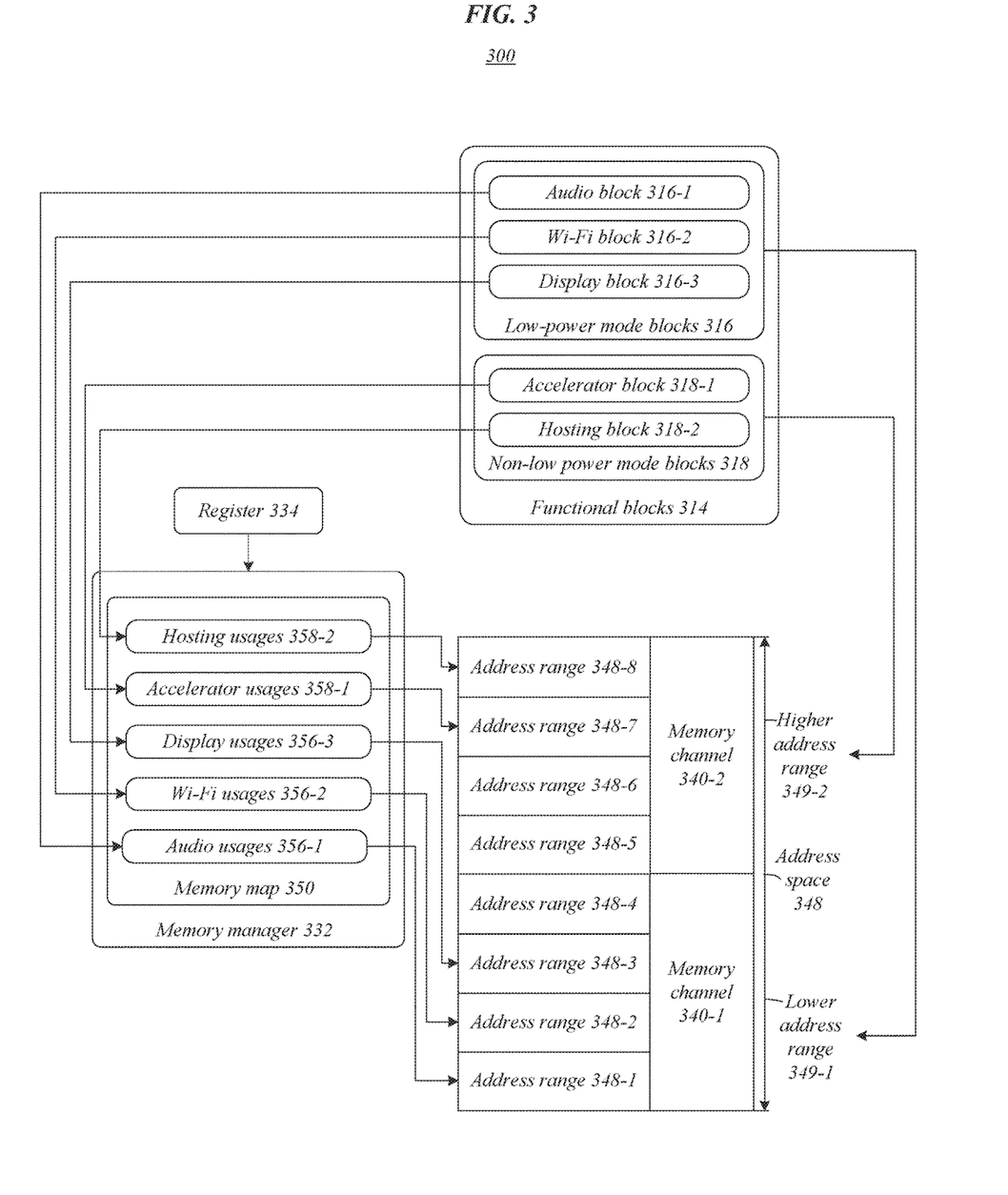
FIG. 3 illustrates an exemplary aspects of a memory manager to map low-power mode usages to a memory channel according to one or more embodiments described herein.

FIG. 3 illustrates an exemplary aspects of memory manager 332 mapping low-power mode usages to memory channel 340-1 in environment 300 according to one or more embodiments described herein. In many embodiments, one or more components of environment 300 may be the same or similar to components of operating environments 100, 200. Operating environment 300 may include functional blocks 314, memory manager 332 with memory map 350, register 334, memory channel 340-1 with corresponding address ranges 348-1, 348-2, 348-3, 348-4, and memory channel 340-2 with corresponding address ranges 348-5, 348-6, 348-7, 348-8. As shown in the illustrated embodiment, address ranges 348-1, 348-2, 348-3, 348-4 may be toward the lower address range 349-1 of address space 348 while address ranges 348-5, 348-6, 348-7, 348-8 may be toward the higher address range 349-2 of address space 348. Embodiments are not limited in this context.

In various embodiments, memory manager 332 may generate, maintain, and/or manipulate memory map 350 such that usages associated with low-power mode blocks 316 including audio block 316-1, Wi-Fi block 316-2, and display block 316-3 are mapped to the lower address range 349-1 in memory channel 340-1. In some embodiments, one or more aspects of generating, maintaining, and/or manipulating memory map 350 may be based on the contents of register 334. In environment 300, audio usages 356-1 associated with audio block 316-1 in low-power mode blocks 316 may be memory mapped to address range 348-1 of memory channel 340-1; Wi-Fi usages 356-2 associated with Wi-Fi block 316-2 in low-power mode blocks 316 may be memory mapped to address range 348-2 of memory channel 340-1; and display usages 356-3 associated with display block 316-3 in low-power mode blocks 316 may be memory mapped to address range 348-3 of memory channel 340-1.

Additionally, accelerator usages 358-1 associated with accelerator block 318-1 in non-low power mode blocks 318 may be memory mapped to address range 348-7 and hosting usages 358-2 associated with hosting block 318-2 in non-low power mode blocks 318 may be memory mapped to address range 348-8. In some embodiments, non-low power model blocks 318 may be interleaved between memory channels 340-1, 340-2. For instance, usages by non-low power mode blocks 318 (e.g., accelerator usages 358-1, hosting usages 358-2) may be interleaved between address ranges 348-4, 348-5, 348-6, 348-7, 348-8 of memory channels 340-1, 340-2.

Figure 4:
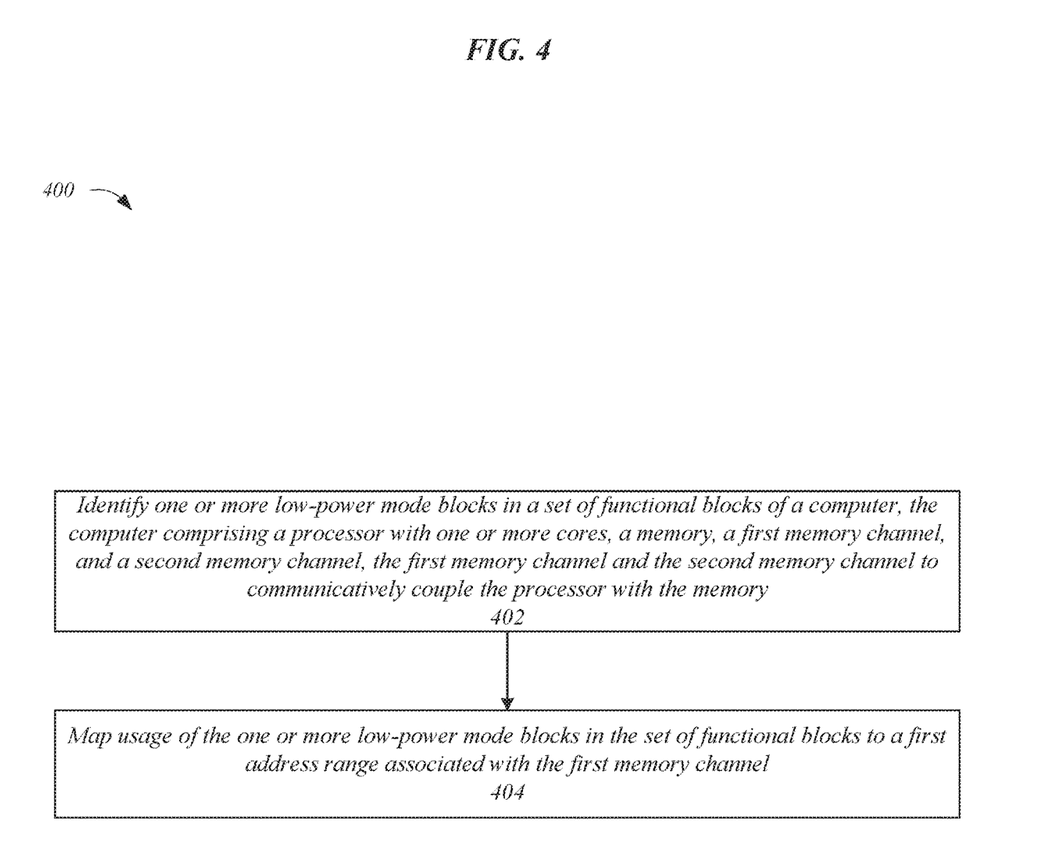
FIG. 4 illustrates an exemplary logic flow according to one or more embodiments described here.

FIG. 4 illustrates one embodiment of a logic flow 400, which may be representative of operations that may be executed in various embodiments in conjunction with techniques for memory access in a reduced power state. The logic flow 400 may be representative of some or all of the operations that may be executed by one or more components/devices/environments described herein, such as computer 101, 201 and/or memory manager 232, 332. The embodiments are not limited in this context.

In the illustrated embodiments, logic flow 400 may begin at block 402. At block 402 "identify one or more low-power mode blocks in a set of functional blocks of a computer, the computer comprising a processor with one or more cores, a memory, a first memory channel, and a second memory channel, the first memory channel and the second memory channel to communicatively couple the processor with the memory" one or more low-power mode blocks in a set of functional blocks of a computer may be identified. For example, low power mode blocks 216 in function blocks 214 of computer 201 may be identified, such as by memory manager 232. In many embodiments, the computer 201 may include one or more processor cores 202, main memory 206, first memory channel 240-1, and second memory channel 240-2.

Proceeding to block 404 "map usage of the one or more low-power mode blocks in the set of functional blocks to a first address range associated with the first memory channel" usage of the one or more low-power mode blocks in the set of functional blocks may be mapped to a first address range associated with the first memory channel. For example, the first address range may include address ranges 348-1, 348-2, 348-3 associated with memory channel 340-1. In such examples, usages by audio block 316-1, Wi-Fi block 316-2, and display block 316-3 of low-power blocks 316 may be memory mapped to address ranges 348-1, 348-2, 348-3 of memory channel 340-1.

Figure 5:
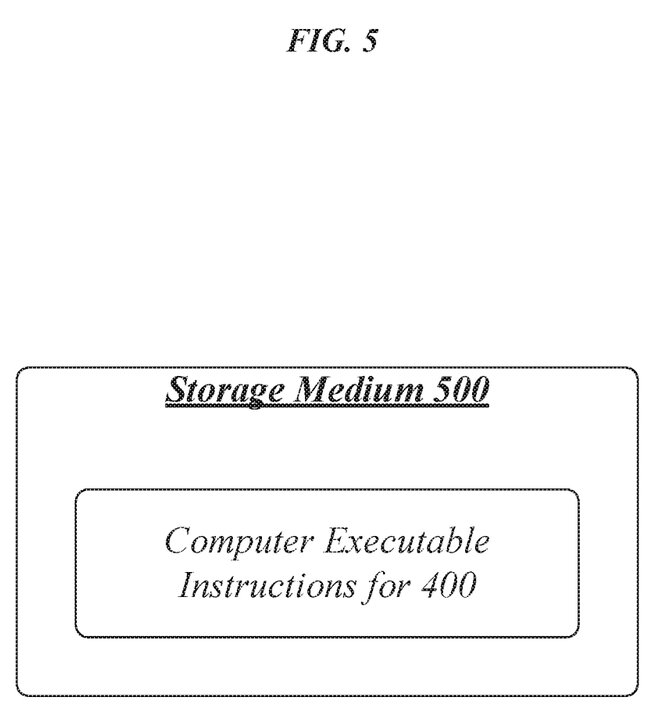
FIG. 5 illustrates an embodiment of a storage medium according to one or more embodiments described herein.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement one or more of logic flows or operations described herein, such as with respect to logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
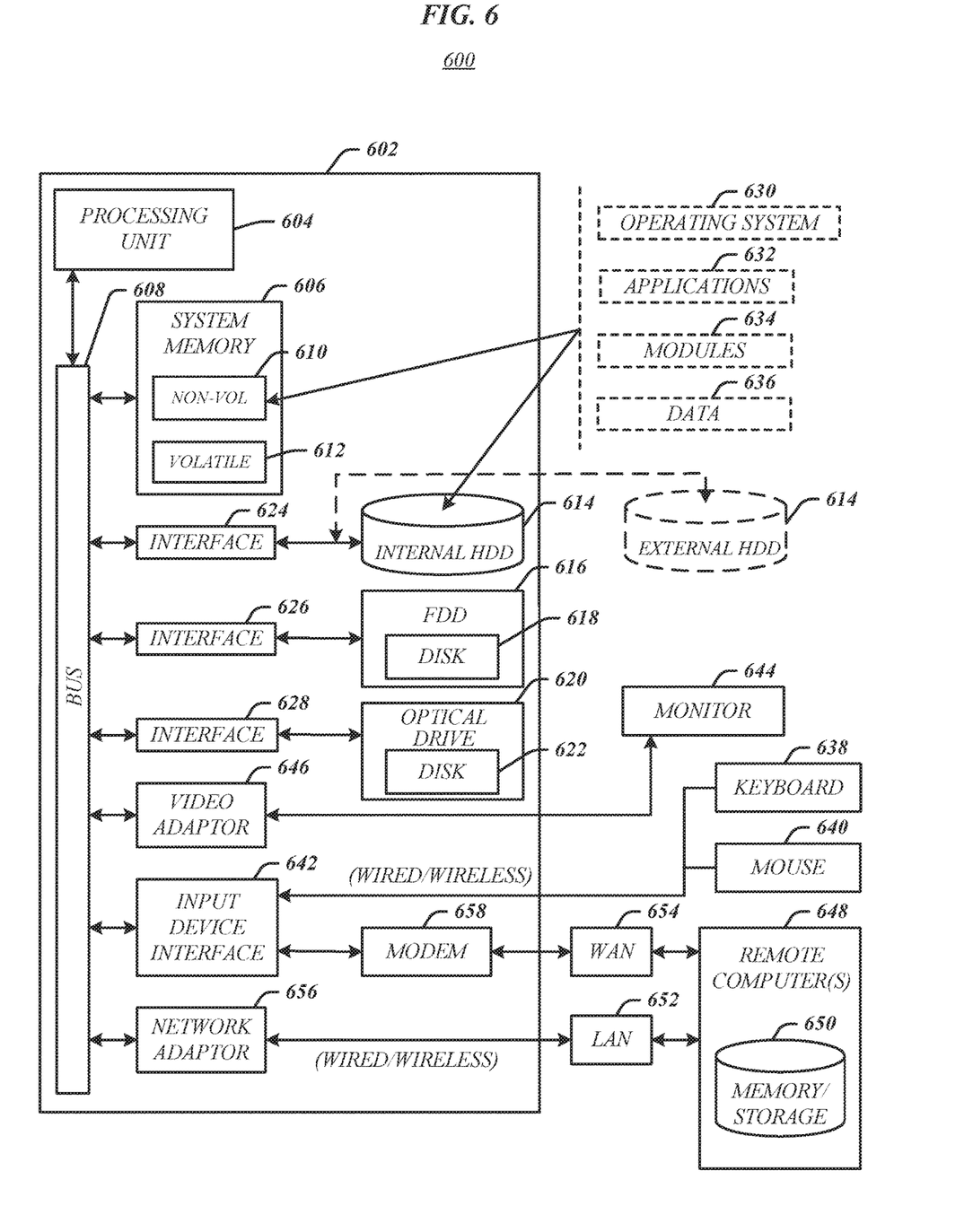
FIG. 6 illustrates an embodiment of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more components described herein. In some embodiments, computing architecture 600 may be representative, for example, of a computing device that implements or utilizes one or more portions of components and/or techniques described herein, such as computer 101, processor circuitry 102, core support circuitry 104, main memory 106, and/or chipset 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/ wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
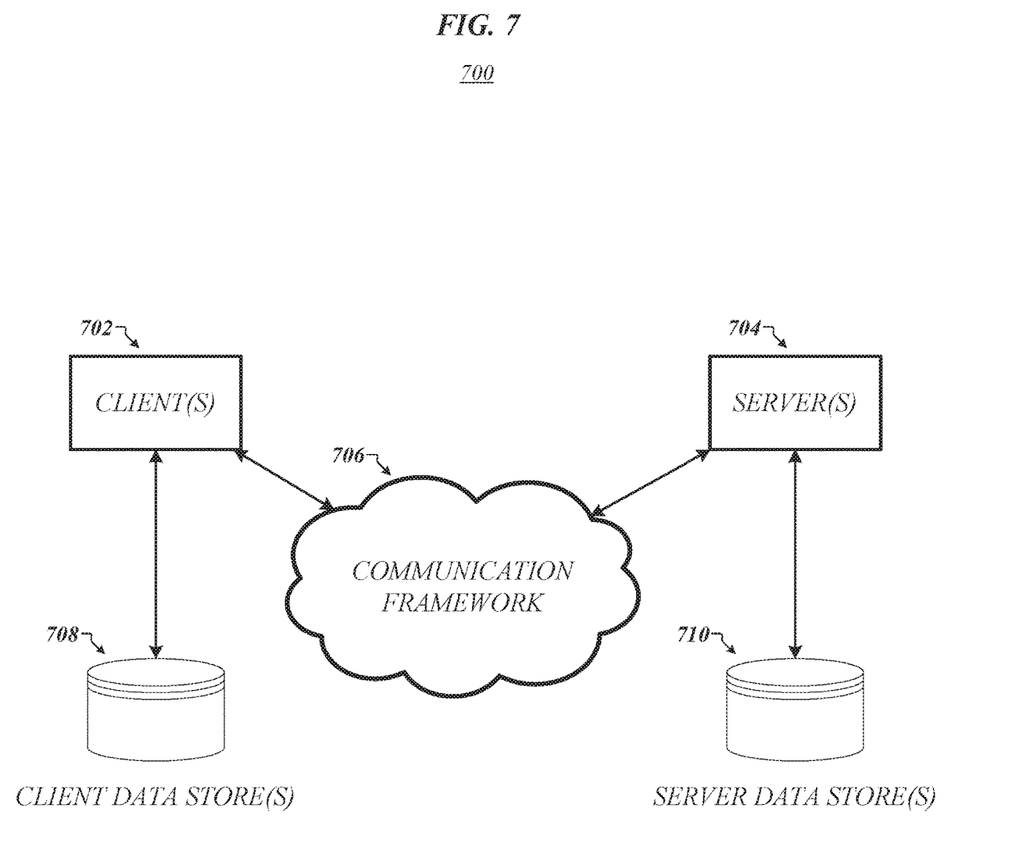
FIG. 7 illustrates an embodiment of a communications architecture according to one or more embodiments described herein.

FIG. 7 illustrates a block diagram of an exemplary communications architecture 700 suitable for implementing various techniques and/or embodiments as previously described, such as embodiments of computer 101, computer 201, memory manager 232, and/or memory manager 332. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor comprising one or more cores; and memory comprising a first memory portion and a second memory portion, the first memory portion comprising instructions that when executed by the processor cause the processor to: identify one or more low-power mode blocks in a set of functional blocks of a computer, the computer comprising the processor, the memory, a first memory channel, and a second memory channel, the first memory channel and the second memory channel to communicatively couple the processor with the second memory portion; and map usage of the one or more low-power mode blocks in the set of functional blocks to a first address range associated with the first memory channel.

Example 2 includes the subject matter of Example 1, the second memory channel associated with a second address range, wherein the first address range is lower than the second address range.

Example 3 includes the subject matter of Example 1, the first memory portion comprising instructions that when executed by the processor cause the processor to establish a low-power communication pipeline between the second memory portion and at least one core of the processor via the first memory channel based on an indication of a transition by the computer from a first power state to a second power state, wherein the second power state is a lower power state than the first power state.

Example 4 includes the subject matter of Example 3, the first memory portion comprising instructions that when executed by the processor cause the processor to disable the second memory channel to establish a low-power communication pipeline between the second memory portion and the processor via the first memory channel.

Example 5 includes the subject matter of Example 4, the first memory portion comprising instructions that when executed by the processor cause the processor to set one or more memory modules associated with the second memory channel to self-refresh mode to disable the second memory channel.

Example 6 includes the subject matter of Example 4, the first memory portion comprising instructions that when executed by the processor cause the processor to utilize power gating on one or more memory modules associated with the second memory channel to disable the second memory channel.

Example 7 includes the subject matter of Example 3, the indication of the transition by the computer from the first power state to the second power state comprising contents of a register.

Example 8 includes the subject matter of Example 7, the first memory portion comprising instructions that when executed by the processor cause the processor to utilize a basic input/output system (BIOS) of the computer to set the contents of the register.

Example 9 includes the subject matter of Example 1, the set of functional blocks including the one or more low-power mode blocks and two or more high-power mode blocks, and the first memory portion comprising instructions that when executed by the processor cause the processor to utilize interleaving to map usage of the two or more high-power mode blocks to a second address range associated with the first memory channel and a third address range associated with the second memory channel.

Example 10 includes the subject matter of Example 1, the first memory portion comprising main memory and the second memory portion comprising secondary memory.

Example 11 includes the subject matter of Example 1, the first and second memory portions comprising a common memory.

Example 12 is at least one non-transitory computer-readable medium comprising a set of instructions that, in response to being executed by a processor circuit, cause the processor circuit to: identify one or more low-power mode blocks in a set of functional blocks of a computer, the computer comprising a processor with one or more cores, a memory, a first memory channel, and a second memory channel, the first memory channel and the second memory channel to communicatively couple the processor with the memory; and map usage of the one or more low-power mode blocks in the set of functional blocks to a first address range associated with the first memory channel.

Example 13 includes the subject matter of Example 12, comprising instructions that, in response to being executed by the processor circuit cause the processor circuit to establish a low-power communication pipeline between the memory and at least one core of the processor via the first memory channel based on an indication of a transition by the computer from a first power state to a second power state, wherein the second power state is a lower power state than the first power state.

Example 14 includes the subject matter of Example 13, comprising instructions that, in response to being executed by the processor circuit cause the processor circuit to disable the second memory channel to establish a low-power communication pipeline between the memory and the processor via the first memory channel.

Example 15 includes the subject matter of Example 14, comprising instructions that, in response to being executed by the processor circuit cause the processor circuit to set one or more memory modules associated with the second memory channel to self-refresh mode to disable the second memory channel.

Example 16 includes the subject matter of Example 14, comprising instructions that, in response to being executed by the processor circuit cause the processor circuit to utilize power gating on one or more memory modules associated with the second memory channel to disable the second memory channel.

Example 17 includes the subject matter of Example 13, comprising instructions that, in response to being executed by the processor circuit cause the processor circuit to utilize a basic input/output system (BIOS) of the computer to set contents of a register, wherein the contents of the register comprise the indication of the transition by the computer from the first power state to the second power state.

Example 18 includes the subject matter of Example 12, the set of functional blocks including the one or more low-power mode blocks and two or more high-power mode blocks, and the at least one non-transitory computer-readable medium comprising instructions that, in response to being executed by the processor circuit cause the processor circuit to utilize interleaving to map usage of the two or more high-power mode blocks to a second address range associated with the first memory channel and a third address range associated with the second memory channel.

Example 19 is a computer-implemented method, comprising: identifying one or more low-power mode blocks in a set of functional blocks of a computer, the computer comprising a processor with one or more cores, a memory, a first memory channel, and a second memory channel, the first memory channel and the second memory channel to communicatively couple the processor with the memory; and mapping usage of the one or more low-power mode blocks in the set of functional blocks to a first address range associated with the first memory channel.

Example 20 includes the subject matter of Example 19, comprising establishing a low-power communication pipeline between the memory and at least one core of the processor via the first memory channel based on an indication of a transition by the computer from a first power state to a second power state, wherein the second power state is a lower power state than the first power state.

Example 21 includes the subject matter of Example 20, comprising disabling the second memory channel to establish a low-power communication pipeline between the memory and the processor via the first memory channel.

Example 22 includes the subject matter of Example 21, comprising setting one or more memory modules associated with the second memory channel to self-refresh mode to disable the second memory channel.

Example 23 includes the subject matter of Example 21, comprising utilizing power gating on one or more memory modules associated with the second memory channel to disable the second memory channel.

Example 24 includes the subject matter of Example 20, comprising utilizing a basic input/output system (BIOS) of the computer to set contents of a register, wherein the contents of the register comprise the indication of the transition by the computer from the first power state to the second power state.

Example 25 includes the subject matter of Example 19, the set of functional blocks including the one or more low-power mode blocks and two or more high-power mode blocks, and comprising utilizing interleaving to map usage of the two or more high-power mode blocks to a second address range associated with the first memory channel and a third address range associated with the second memory channel.

Example 26 is an apparatus comprising: means for identifying one or more low-power mode blocks in a set of functional blocks of a computer, the computer comprising a processor with one or more cores, a memory, a first memory channel, and a second memory channel, the first memory channel and the second memory channel to communicatively couple the processor with the memory; and means for mapping usage of the one or more low-power mode blocks in the set of functional blocks to a first address range associated with the first memory channel.

Example 27 includes the subject matter of Example 26, comprising means for establishing a low-power communication pipeline between the memory and at least one core of the processor via the first memory channel based on an indication of a transition by the computer from a first power state to a second power state, wherein the second power state is a lower power state than the first power state.

Example 28 includes the subject matter of Example 27, comprising means for disabling the second memory channel to establish a low-power communication pipeline between the memory and the processor via the first memory channel.

Example 39 includes the subject matter of Example 28, comprising means for setting one or more memory modules associated with the second memory channel to self-refresh mode to disable the second memory channel.

Example 30 includes the subject matter of Example 28, comprising means for utilizing power gating on one or more memory modules associated with the second memory channel to disable the second memory channel.

Example 31 includes the subject matter of Example 27, comprising means for utilizing a basic input/output system (BIOS) of the computer to set contents of a register, wherein the contents of the register comprise the indication of the transition by the computer from the first power state to the second power state.

Example 32 includes the subject matter of Example 26, the set of functional blocks including the one or more low-power mode blocks and two or more high-power mode blocks, and comprising means for utilizing interleaving to memory map usage of the two or more high-power mode blocks to a second address range associated with the first memory channel and a third address range associated with the second memory channel.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
a processor comprising one or more cores; and
memory comprising a first memory portion and a second memory portion, the first memory portion comprising instructions that when executed by the processor cause the processor to:
identify one or more low-power mode blocks in a set of functional blocks of a computer, the computer comprising the processor, the memory, a first memory channel and a second memory channel, the first memory channel and the second memory channel to communicatively couple the processor with the second memory portion; and
map usage of the one or more low-power mode blocks in the set of functional blocks to a first address range associated with the first memory channel.

2. The apparatus of claim 1, the second memory channel associated with a second address range, wherein the first address range is lower than the second address range.

3. The apparatus of claim 1, the second memory comprising instructions that when executed by the processor cause the processor to establish a low-power communication pipeline between the second memory and at least one core of the processor via the first memory channel based on an indication of a transition by the computer from a first power state to a second power state, wherein the second power state is a lower power state than the first power state.

4. The apparatus of claim 3, the second memory comprising instructions that when executed by the processor cause the processor to disable the second memory channel to establish a low-power communication pipeline between the second memory and the processor via the first memory channel.

5. The apparatus of claim 4, the second memory comprising instructions that when executed by the processor cause the processor to set one or more memory modules associated with the second memory channel to self-refresh mode to disable the second memory channel of the two or more memory channels.

6. The apparatus of claim 4, the second memory comprising instructions that when executed by the processor cause the processor to utilize power gating on one or more memory modules associated with the second memory channel to disable the second memory channel of the two or more memory channels.

7. The apparatus of claim 3, the indication of the transition by the computer from the first power state to the second power state comprising contents of a register.

8. The apparatus of claim 7, the second memory comprising instructions that when executed by the processor cause the processor to utilize a basic input/output system (BIOS) of the computer to set the contents of the register.

9. The apparatus of claim 1, the set of functional blocks including the one or more low-power mode blocks and two or more high-power mode blocks, and the second memory comprising instructions that when executed by the processor cause the processor to utilize interleaving to map usage of the two or more high-power mode blocks to a second address range associated with the first memory channel and a third address range associated with the second memory channel.

10. The apparatus of claim 1, the first memory portion comprising main memory and the second memory portion comprising secondary memory.

11. The apparatus of claim 1, the first and second memory portions comprising a common memory.

12. At least one non-transitory computer-readable medium comprising a set of instructions that, in response to being executed by a processor circuit, cause the processor circuit to:
identify one or more low-power mode blocks in a set of functional blocks of a computer, the computer comprising a processor with one or more cores, a memory, and first and second memory channels to communicatively couple the processor with the memory; and
map usage of the one or more low-power mode blocks in the set of functional blocks to a first address range associated with the first memory channel.

13. The at least one non-transitory computer-readable medium of claim 12, comprising instructions that, in response to being executed by the processor circuit cause the processor circuit to establish a low-power communication pipeline between the memory and at least one core of the processor via the first memory channel based on an indication of a transition by the computer from a first power state to a second power state, wherein the second power state is a lower power state than the first power state.

14. The at least one non-transitory computer-readable medium of claim 13, comprising instructions that, in response to being executed by the processor circuit cause the processor circuit to disable the second memory channel to establish a low-power communication pipeline between the memory and the processor via the first memory channel.

15. The at least one non-transitory computer-readable medium of claim 14, comprising instructions that, in response to being executed by the processor circuit cause the processor circuit to set one or more memory modules associated with the second memory channel to self-refresh mode to disable the second memory channel of the two or more memory channels.

16. The at least one non-transitory computer-readable medium of claim 14, comprising instructions that, in response to being executed by the processor circuit cause the processor circuit to utilize power gating on one or more memory modules associated with the second memory channel to disable the second memory channel of the two or more memory channels.

17. The at least one non-transitory computer-readable medium of claim 13, comprising instructions that, in response to being executed by the processor circuit cause the processor circuit to utilize a basic input/output system (BIOS) of the computer to set contents of a register, wherein the contents of the register comprise the indication of the transition by the computer from the first power state to the second power state.

18. The at least one non-transitory computer-readable medium of claim 12, the set of functional blocks including the one or more low-power mode blocks and two or more high-power mode blocks, and the at least one non-transitory computer-readable medium comprising instructions that, in response to being executed by the processor circuit cause the processor circuit to utilize interleaving to map usage of the two or more high-power mode blocks to a second address range associated with the first memory channel and a third address range associated with the second memory channel.

19. A computer-implemented method, comprising:
identifying one or more low-power mode blocks in a set of functional blocks of a computer, the computer comprising a processor with one or more cores, a memory, and first and second memory channels to communicatively couple the processor with the memory; and mapping usage of the one or more low-power mode blocks in the set of functional blocks to a first address range associated with the first memory channel.

20. The computer-implemented method of claim 19, comprising establishing a low-power communication pipeline between the memory and at least one core of the processor via the first memory channel based on an indication of a transition by the computer from a first power state to a second power state, wherein the second power state is a lower power state than the first power state.

21. The computer-implemented method of claim 20, comprising disabling the second memory channel to establish a low-power communication pipeline between the memory and the processor via the first memory channel.

22. The computer-implemented method of claim 21, comprising setting one or more memory modules associated with the second memory channel to self-refresh mode to disable the second memory channel.

23. The computer-implemented method of claim 21, comprising utilizing power gating on one or more memory modules associated with the second memory channel to disable the second memory channel.

24. The computer-implemented method of claim 20, comprising utilizing a basic input/output system (BIOS) of the computer to set contents of a register, wherein the contents of the register comprise the indication of the transition by the computer from the first power state to the second power state.

25. The computer-implemented method of claim 19, the set of functional blocks including the one or more low-power mode blocks and two or more high-power mode blocks, and comprising utilizing interleaving to map usage of the two or more high-power mode blocks to a second address range associated with the first memory channel and a third address range associated with the second memory channel.

* * * * *